March 31, 1964 W. S. ALDERSON 3,127,605
MOVING TARGET RADAR SYSTEMS
Filed Feb. 24, 1960 4 Sheets-Sheet 1
FIG.1
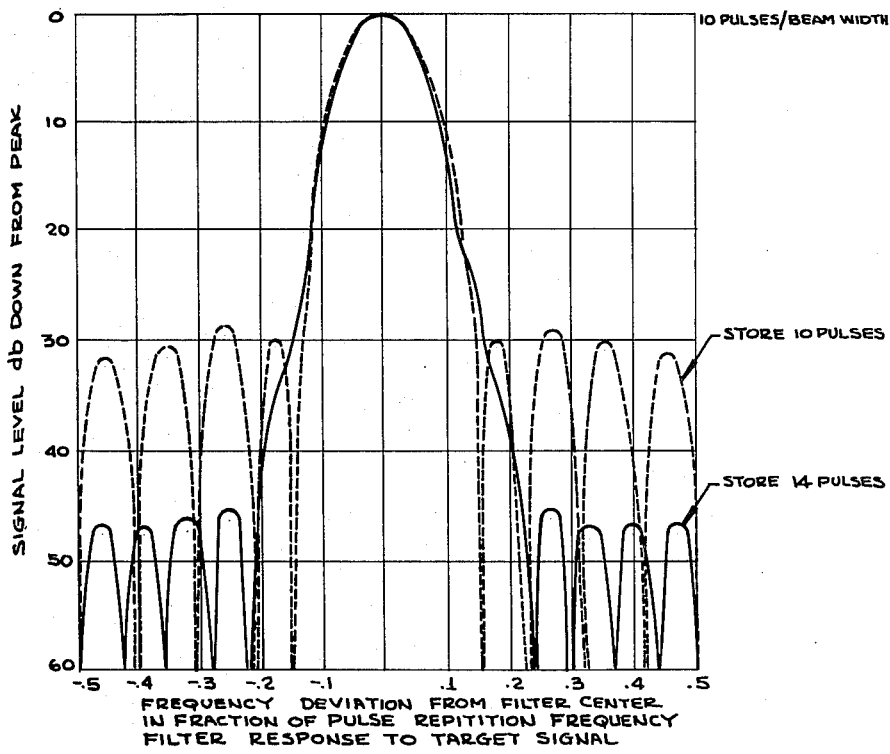
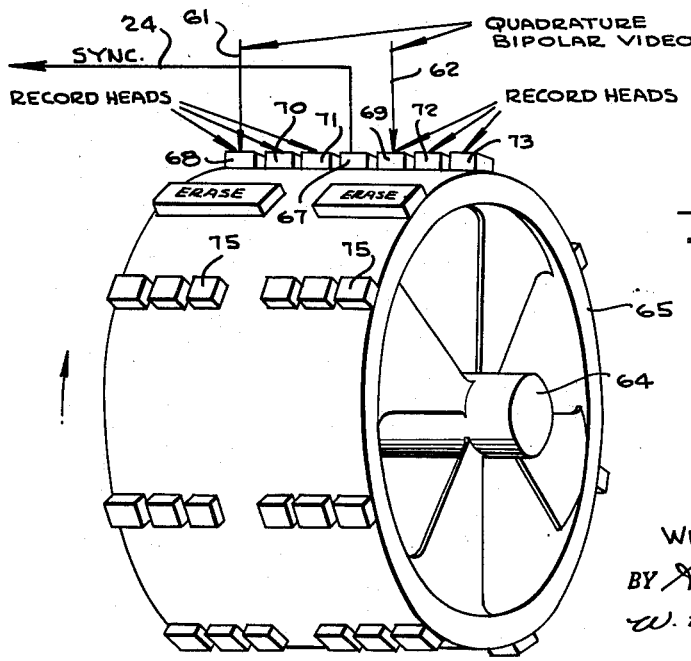
FIG.4
INVENTOR.
WILLIAM S. ALDERSON
BY
ATTORNEYS

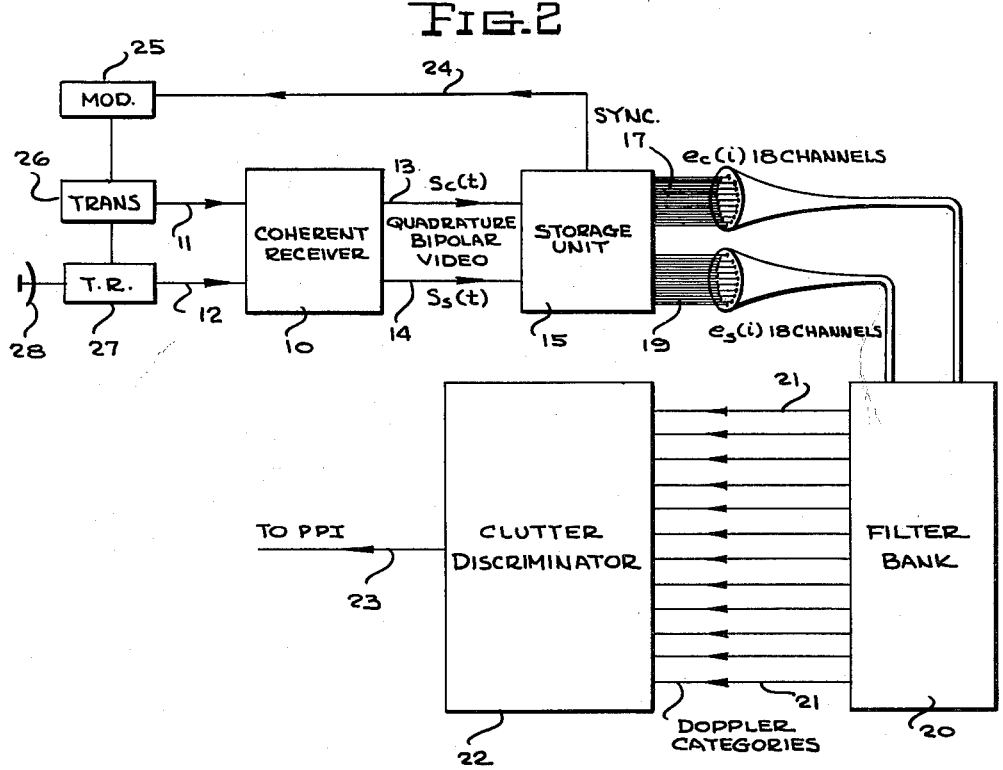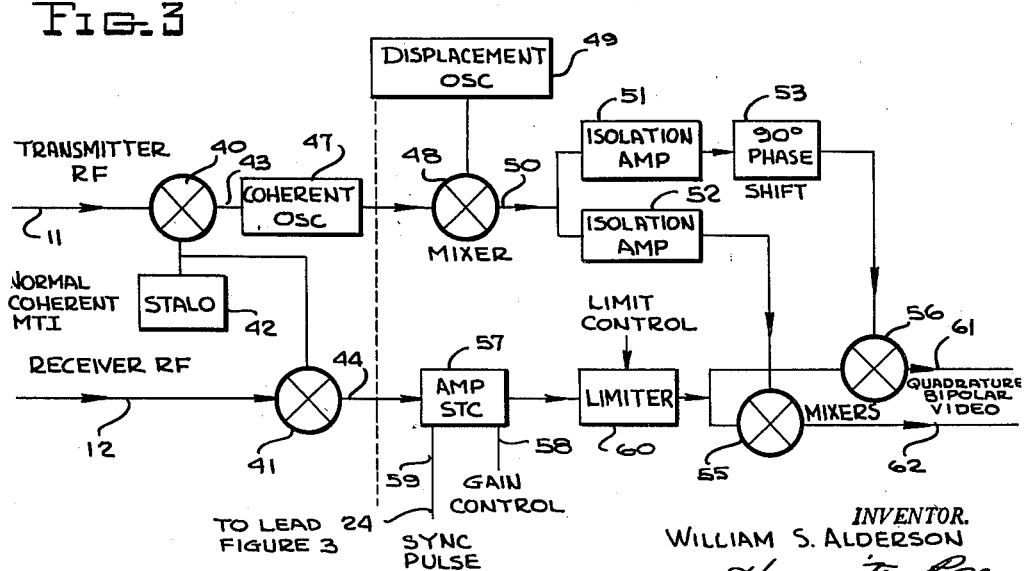

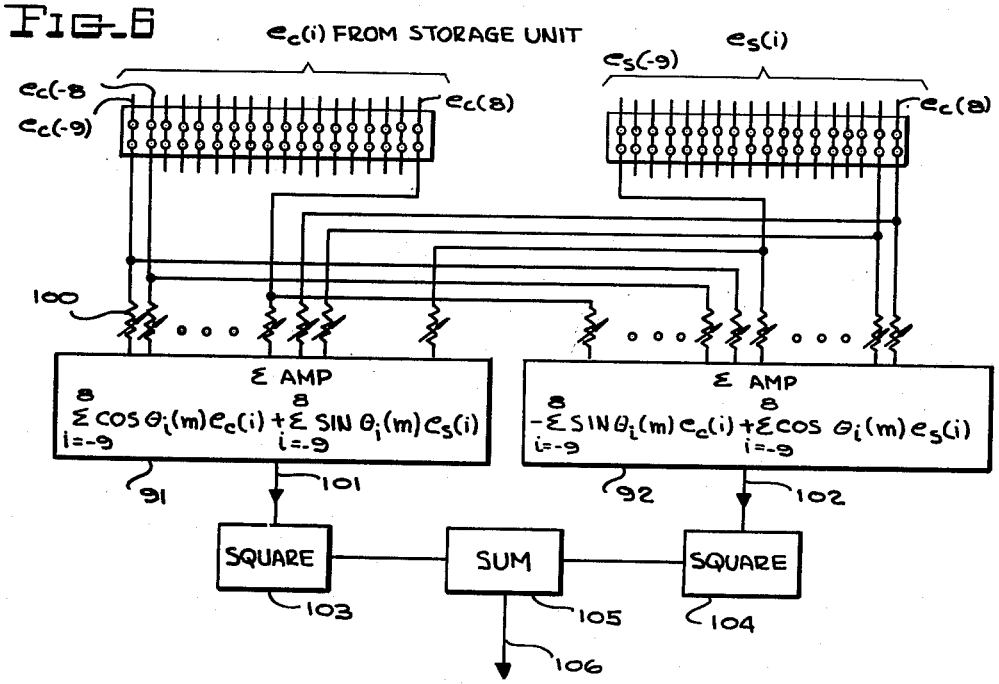
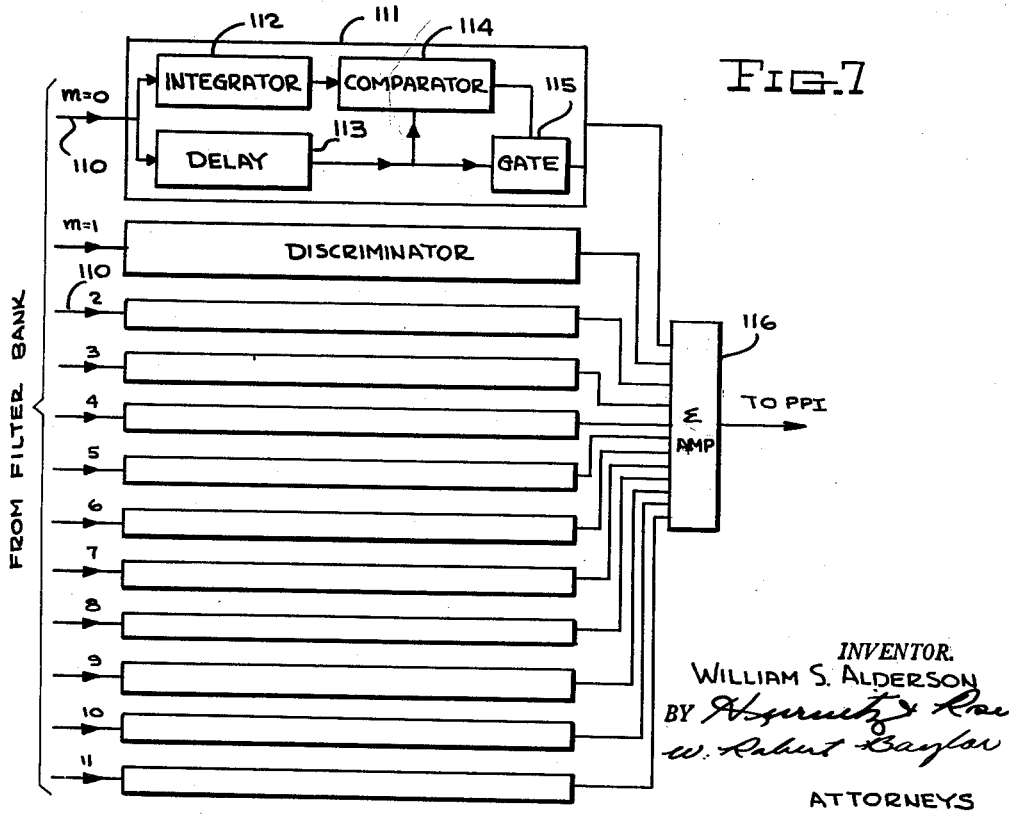

3,127,605
MOVING TARGET RADAR SYSTEMS
William S. Alderson, Springfield, Va., assignor, by mesne assignments, to Melpar, Inc., Falls Church, Va., a corporation of Delaware
Filed Feb. 24, 1960, Ser. No. 10,658
8 Claims. (Cl. 343—7.7)

The present invention relates generally to moving target indication (MTI) radar systems and more particularly to MTI radar systems employing coherent integration of target signals in discrete velocity categories.

The present MTI techniques of handling radar data in the presence of clutter are divided into two categories, coherent and non-coherent. Coherent MTI, which can eliminate ground clutter, is ineffective against storm clouds. Cluttergated and cluttered-references MTI is ineffective because the gating is accomplished before integration, and, although the clutter is reduced, the signal is not integrated. Thus, it is required to hunt for the unintegrated target signal in the clutter residue.

Radar data processing equipment according to the present invention has the capability of using all the information that is available in received radar signals to achieve coherent integration of all target signals seen by the radar, and to establish these targets in a number of velocity categories for discrimination purposes. It is also able to distinguish strongly against high power interference signals that do not have the repetition rate of the radar, and against targets that are widely distributed in space.

In accordance with the present invention, a magnetic drum is employed which stores the received signals of the last 1.4 N repetition periods (the factor 1.4 being convenient but not limiting) of two quadrature bipolar video chanenls, N being approximately the number of pulses in a radar beamwidth. The 2.8 N thus stored signals are read out in parallel and fed to sets of passive weighting functions. Each set is designed to integrate a given target velocity.

The final output consists of N channels of coherent integrated video, each channel representing a target velocity category. Those channels which contain signals from extended clutter may be gated off, the remaining channels representing targets at different velocities, which continue to apply their signals to the PPI.

The signal received by a pulse radar contains a high degree of information. The time of arrival of the received signal, relative to the time of transmission, is a measure of the range of the target. The resolvable measurement of time of arrival, such that target signals will not interfere with one another, is equal to the pulse duration of the signal. Also contained in the received signal is information concerning the speed of the target. The Doppler shift frequency, or the difference in frequency between the transmitted and received signals, is linearly related to the target speed. The resolvable Doppler frequency is equal to the reciprocal of the duration of the target illumination time as determined by the beamwidth and rotation rate of the antenna.

When a radar signal is received and analyzed for its information content, target parameters are found in the radar signal which are related to position (time-of-arrival) and speed (Doppler frequency). The signal then contains plural informational elements. These informational elements have two components, which may be conceived of as dimensions, i.e. width and length. The width of one element, time-of-arrival, is the pulse duration, $\tau$. The length of this element in the maximum Doppler frequency is the reciprocal of the illumination time, $T_1$.

The possibility of second and higher time around echos requires that additional elements be introduced every repetition period apart. This is the well known range ambiguity problem of search radar and prevents the employment of high repetition rates. Equally fundamental, but not as well known, is the ambiguity of the Doppler frequency. The ambiguity is caused by the modulation, of what would otherwise be C.W. signals, by repeated pulses. This modulated signal has frequency components at the frequency of the C.W. signal, plus components every integer multiple of the repetition frequency of the radar away from this frequency.

When the received signal is mixed with the transmitted signal, the carrier frequency of the radar is beat down to zero frequency and the low frequency spectrum of the signal consists of spikes occurring at the Doppler frequency and integer multiples of the repetition frequency away from this Doppler out as far as the spectrum of the pulse allows. However, since negative frequences are not possible, these frequencies are reflected about zero into positive frequencies. Patterns that are periodic and mirror-imaged about any point are also mirror-imaged about points every half period away from the first discovered image point. Thus, when the radar carrier frequency is beat down to zero frequency, the pattern of ambiguity is repeated every half repetition frequency period.

To avoid this the radar R-F carrier may be beat down to about half a pulse spectrum width away from zero frequency so that the resulting pulse spectrum will not have significant negative frequency content to fold back into the positive frequencies. This expedient is permissive.

The resulting pattern in frequency is now periodic in intervals of the pulse repetition frequency. The width of spectrum is the reciprocal of the illumination time, $T_1$. The number of resolvable velocity categories is found by dividing $1/T_1$ into $f_{rep}$. Thus, $N = f_{rep}T_1$ which is also the number of pulses in a beamwidth.

In present pulse search radars, no reference is made to the exact transmitted frequency, and the Doppler resolution is lost. Present MTI techniques retain a small amount of Doppler information in that targets are placed into two categories, e.g., those targets which have a Doppler frequency close to zero or an integer multiple of the repetition frequency and all other targets.

The cathode ray tube of a radar system acts like an integrator by displaying all the received signals from a given target side-by-side, or even by piling them slightly on top of one another. The cathode ray tube is, however, less than a perfect integrator when the spot size does not match the displayed size of the radar pulse; also, more noise than necessary is integrated at a given position on the scope. In addition, the radar operator is forced to search a noisy scope face for a target signal; when the target signal is weak, there is nothing particularly striking to attract his eye to the right place on the tube face, enabling him to perform the integration. Since the number of places the operator can integrate on a tube face per unit time is greatly limited, and his eye is attracted by the stronger signals, the weak signals are not likely to be integrated at all. It is difficult to evaluate how much deterioration in sensitivity results from the operator's failure to be attracted to the scope position, where he would recognize the integration of the weak signals.

Quartz delay line integrators provide a 3 db improvement in sensitivity over the scope-operator combination if the operator knows where to look for a target. Thus, the loss of 3 db is a measure of the imperfection of the cathode ray tube-operator combination as an integrator under the most favorable conditions.

The integration is non-coherent because target velocity is not known or measured. The improvement in sensitivity over a single pulse is equal to the square root of the number of pulses in a beamwidth. If the integration can be made coherent, on the other hand, the improvement in sensitivity over that required for a single pulse is equal to the number of pulses in a beamwidth. Thus, coherent integration is better than non-coherent integration by the factor of the square root of the number of pulses in a beamwidth.

When integration is performed before the signal is presented on the PPI indicator, the imperfection of such indicators as integrators no longer reduces the available sensitivity.

Radar systems normally receive an overabundance of unwanted signals. The great information capability of the radar is wasted, because signals from ground-clutter and storm clouds as well as from aircraft targets are received. In addition, all kinds of electromagnetic interference create a confusion of patterns and target-like spots on the PPI indicator.

Signal characteristics that can be used to distinguish an aircraft signal from ground-clutter or interference signals are as follows:

Amplitude
    Time of occurrence
    Repetition rate
    Pulse width duration
    Doppler frequency If the unwanted signal possesses all the characteristics of a target, it will have to be accepted as one. Otherwise, the degree to which the clutter signal possesses the characteristic of target signals will determine the degree of error, and will determine the best way to handle the signal to maximize the amount of usable information available.

The relative amplitudes of clutter signals, as compared to the spectrum of possible target signals, is not enough to distinguish from target signals. However, interfering signals can have amplitudes many times greater than expected radar signals. Without any precautions, these signals will be displayed as bright spots or patterns of spots on the PPI indicator. Severe limiting in the I-F can reduce the severity of the brightness, or, the video can be used to switch itself off whenever it exceeds a certain threshold value. If integration of signals that have the repetition period of the radar is accomplished, the limited interfering signal only contributes once, and its integrated signal will be compared to a repetitive target signal which is integrated by the number of the pulses in a beamwidth. Since each signal from the target is as strong as the interfering signal, because of limiting, the integrated target signals are much greater than unintegrated interference signals. This difference in amplitude can be used to eliminate the interfering signal, e.g., by base clipping.

Radar signals from clutter process the same repetition frequency as those from targets, and a similar scheme will not be effective against clutter.

The time of arrival of the signal does not increase discrimination capability except that clutter signals arriving at one time should not interfere with target signals arriving at another.

The duration of clutter signals is much greater than the duration of target signals. This fact can be used to switch off or reduce the clutter signal on the scope at the places where long pulses are received. However, since clutter possesses so many of the other characteristics of aircraft signals, it is not possible to recognize or separate the target signal from the clutter in this manner.

All the characteristics of signal discussed hereinabove provide for the switching off of the radar signal when clutter appears. It has been stated that radar signals can be arranged into N velocity categories. Moving clutter, depending on its velocity, could appear in any one of the velocity categories, but probably only strongly in one of them at a time. If a target were to fall in the same velocity category, it would not be distinguishable in any manner from clutter, and would have to be discarded with the clutter when it is switched off. However, the video from the other categories does not have to be switched off and the targets in them are therefore not lost.

Assume that a received radar signal is compared to the frequency and phase of a transmitted signal and is converted down to a zero Doppler signal, as is accomplished in present MTI radars, with coherent oscillators. The received radar signal is $A(t) \cos(2\pi f_d t + \phi)$, Equation 1, where $A(t)$ is modulation due to variation in antenna gain, as the beam center scans pass the target, $f_d = 2f_{rt}U/c$, the Doppler frequency of the signal, $\phi$=unavoidable random phase. U is the radial velocity of the target.

Since the transmitted radar signal is pulsed, the signals received from any target are merely samples of the above signal taken at the repetition rate of the radar. Thus, for any target, the received signal consists of a finite set of numbers (about 1.4 to twice the number of pulses in a beamwidth, as exemplary values). They are $s_c(i) = A(iT) \cos(2\pi f_d iT + \phi)$, Equation 2, where $i$ is the sample number such that $i=o$ is associated with the signal sampled at beam center $i = -M, -(m-1), \ldots, 3, -2, 0, 1, 2, \ldots, M$ where $2M+1$ is the number of repetition periods over which the integration will be performed.

Essentially, all we receive from the radar for each target are the above 2M samples. Since they are merely a set of numbers, it is possible to discuss data handling in terms of processing these numbers in order to optimumly digest the data.

It is desired to integrate these signals to improve sensitivity. It is also desired to measure $f_d$, in order to place the target in an appropriate velocity category. These requirements are really only one, since the integration has to account for $f_d$.

To accomplish integration, one may appropriately operate on each $S_c(i)$ sample as though each $A(iT)$ was weighted by a factor, and the phase changed with each sample; and then, sum the altered signal. The output signal is then $$C_{out_0} = \sum_{i=-M}^{i=M} A(iT) W(i) \cos(2\pi f_d iT + \phi - \theta_i) \quad (3)$$

where $W(i)$ is the amplitude weighting factor associated with the $i$th sample and $\theta_i$ is the phase change associated with $i$th sample.

The problem reduces to determining the best set of values for the $W(i)$ and $\theta_i$. Regardless of the choice of $W(i)$, if the integration is to be effective it is necessary that the cosine term should not alternate in sign in any manner. This can be accomplished by assigning $\theta_i = i2f_d T$, Equation 4. Output voltage is then $$C_{out_0} = \cos \phi \sum_{i=-M}^{i=M} A(iT) W(i) \quad (5)$$

It is well known that optimum weighting for best sensitivity in noise background is one in which $$W(i) = A(iT)$$

or the expected value of $A(iT)$, i.e., the variation in signal strength, due to antenna modulation.

Two difficulties are apparent: the first is mathematical, in that given a number as shown in Equation 2, it is impossible to directly insert a correcting phase as shown in Equation 3; the second is the undesirability of the cos $\phi$ factor of the integration. Since $\phi$ is a random variable depending on target position, whether or not a strong signal is obtained is left to chance. Present MTI systems are limited in this respect. However, radar systems according to the present invention are not so limited.

It appears that phase correction can be accomplished by adding $\phi$ to the right side of Equation 4. The objective is to establish the N resolvable velocity categories discussed in the introduction. This can be accomplished by using N sets of $\theta_i$, as shown in Equation 4, determined by N preselected values of $f_d$. Additional sets would be required to establish correction of $\phi$.

As an alternative, the signal of Equation 1 may be established by mixing the I-F signal with the signal from a coherent oscillator. If another channel is established by mixing the I-F signal with the signal from the coherent oscillator shifted by 90°, its formula would be $$A(t) \sin (2\pi f_d t + \phi) \quad (6)$$

These signals (Equations 1 and 6) are called a quadrature bipdar video pair. The corresponding $2M+1$ samples are $$S_s(i) = A(iT) \sin (2\pi f_d iT + \phi) \quad (7)$$

If the same set of $\theta_i$ and $W(i)$ are applied to $s_s(i)$ as were applied to $s_c(i)$, the integrated output would be $$C_{out_s} = \sin \phi \sum_{i=M}^{i=M} A(iT) W(i) \quad (8)$$

The square root of the sum of the squares of the two integrated outputs becomes $$C_{out} = \sum_{i=M}^{i=M} A(iT) W(i) \quad (9)$$

and the troublesome random phase is thus eliminated.

Returning again to Equation 3, we note that the change in phase can be brought out from under the cosine term. Equation 3 in the form $$C_{out_0} = \sum_i W(i) \cos \theta_i s_c(i) + \sum_i W(i) \sin \theta_i s_s(i) \quad (10)$$

All the operations of Equation 10 are possible, given the samples $s_c(i)$ and $s_s(2)$. Similarly, $$C_{out_s} = -\sum_i W(i) \cos \theta_i s_s(i) + \sum_i W(i) \sin \theta_i s_c(i) \quad (11)$$

Equations 10 and 11 describe only the proper weighting factors at the time of maximum output. Since target azimuthal position is not known, the last $2M+1$ received signals are tested against the weighting factors as though maximum target signal occurred M repetition periods ago. This must eventually occur for each target, and at this time the signal output for that target will be at maximum signal strength. The $W(i)$ values are then properly aligned with the $A(iT)$.

To demonstrate the filter nature of handling data as indicated in Equations 9, 10 and 11, we assume that the system is designed to integrate a signal of a definite Doppler frequency. Let the Doppler frequency of a signal that passes through this filter deviate from the design frequency by the amount $\delta_f$. When a rectangular beam shape of N pulses is assured, the voltage amplitudes vary as a function of frequency deviation in the following manner:

$$a(\delta_f) = \frac{1}{N} \frac{\sin (\pi \delta_f TN)}{\sin (\pi \delta_f T)} \quad (12)$$

The band pass of this filter is approximately $$\Delta f_d = 1/NT = T_\mathrm{I} \quad (13)$$

The filter response as a function of the deviation of frequency response from the design center frequency of the filter is the same for all N filters. This response for a square beam shape can be designed so that cross talk between filters is only 14 db down.

Radar systems according to the present invention have inherent counter-countermeasures capabilities. Employing a limiter to eliminate strong saturating signals that are not synchronous to the radar repetition rate is effective against rapid swept jamming.

C.W. jamming can enter only one of the N Doppler frequency category channels at a time, leaving the other channels fully operative.

Barrage jamming must divide its energies equally among the N Doppler frequency channels. Thus, to be equally effective against this type radar, barrage jamming power must be increased by the number of pulses in a beamwidth. In the sense that the information used is contained in less frequency space than the totally transmitted spectrum, the equivalent of a pulse compression of the number of pulses in a beamwidth is achieved.

Non-coherent decoy signals and second time-around signals are added in random phase. This implies that the power of the echoes from these decoys is reduced by a factor of N from the target that is being simulated.

The present system may best be analyzed by reference to a set of radar operating characteristics:

$\theta_\mathrm{H} = 1.5$ degrees horizontal beamwidth
$f_\mathrm{rf} = 2880$ megacycles/second
$rpm = 6$ antenna rotation speed
$f_\mathrm{rep} = 300$ cycles/second The number of pulses in a beamwidth is $$N = \frac{\theta_\mathrm{H} f_\mathrm{rep}}{6 \times rpm} = 12.5$$

Thus 12 filters will be constructed whose bandwidth $$fd = \frac{300}{12.5} = 24 \text{ cycles/sec}$$

is slightly less than the spacing between filters $$\frac{300}{12} = 25 \text{ cycles/sec.}$$

The velocity bandwidth corresponding to the Doppler frequency bandwidth of a filter is $$V_\mathrm{BW} \frac{1.8 \times 10 rpm}{\theta_\mathrm{H} f_\mathrm{rf}} = 2.22 \text{ knots}$$

The total range of velocity spread across the range of frequencies equal to the repetition frequency is $$V \text{ range} = 2.22 \times 12.5 = 27.8 \text{ knots}$$

Thus a target with a velocity equal to any integer multiple of 27.8 knots will fall in the filter designed for zero velocity integration.

The fact that the relative velocity of the illuminated clutter varies with the azimuthal direction does not reduce the MTI performance of the set of filters. The clutter signals simply move from one filter to another as the antenna rotates. The output of the filter occupied by the clutter is the only one turned off at any given instant and then only at the ranges of the clutter.

Present MTI radar systems have failed to eliminate broadside clutter because of the difference in velocity of clutter in different portions of the antenna beam pattern. The aircraft speed at which stationary broadside objects distributed across the beamwidth will have a relative radial velocity equal to a filter bandwidth can be calculated.

$$v = \sim \frac{10^5 \cdot rpm}{f_\mathrm{rf} \theta_\mathrm{H}} \sim \text{knots}$$

where $\theta_\mathrm{H}$ is in degrees and $f_\mathrm{rf}$ in megacycles/second.

For the assumed values this becomes 92 knots. Thus broadside clutter will cover about two filters due to aircraft motion.

To keep the sub-clutter visibility down to 46 db, 1.4 times 12.5 or 18 repetition periods will be stored.

It is, accordingly, a broad object of the invention to provide a novel moving target indication radar system.

It is another object of the present invention to provide a Doppler radar system in which multiple Doppler categories are separately examined.

A further object of the invention resides in the provision of a radar system having counter-countermeasure capabilities.

Still another object of the present invention is to provide a pulsed radar system employing magnetic storage devices to achieve signal enhancement and sub-clutter visibility by storing all echo pulses received during each scan across a target.

Another object of the invention is to provide a Doppler radar system in which multiple Doppler categories are separated out by means of passive weighting circuits operative as Doppler frequency filters.

A further object of the invention resides in utilization of quadrature bipolar video signals in a radar receiver.

Another object of the invention resides in the provision of a radar receiver of the pulsed type having provision for separating received signals into Doppler frequency categories, and utilizing quadrature bipolar video signals in its receiver.

The above and still further objects, features and advantages of the present invention will become apparent upon consideration of the following detailed description of one specific embodiment thereof, especially when taken in conjunction with the accompanying drawings, wherein:

FIGURE 1 is a diagram of filter responses of a system according to the present invention;

FIGURE 2 is a overall block diagram of a system according to the invention;

FIGURE 3 is a block diagram of a coherent receiver providing quadrature bipolar video output signals, according to the invention;

FIGURE 4 is a view in perspective of a magnetic drum recorder-reproducer according to the invention;

FIGURE 6 is a block diagram of a single Doppler filter, utilized in the system of FIGURE 2; and FIGURE 7 is a block diagram of a clutter discrimination system employed in the system of FIGURE 2.

Figure 5:
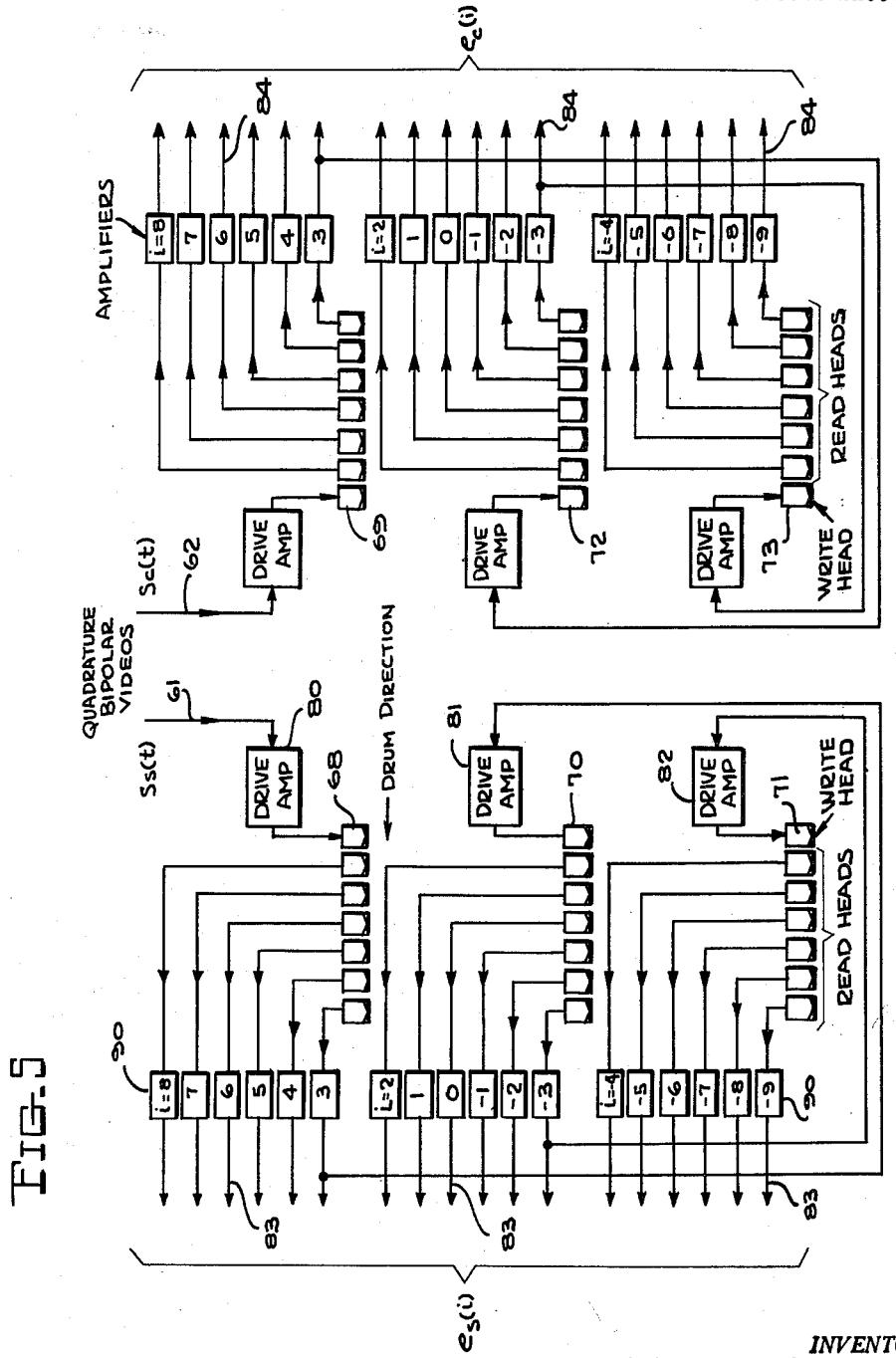
FIGURE 5 is a functional block diagram of the interconnections of the read-in and read-out heads of the recorder-reproducer of FIGURE 4.

Referring now more particularly to FIGURE 2 of the accompanying drawings, and considering first the major components of the present system, a coherent receiver 10 is provided, to which is applied sampled transmitted pulses, via lead 11, and received R.F. echo signal via lead 12. The coherent receiver 10 generates two outputs which represent quadrature bipolar video signals $S_c(t)$ and $S_s(t)$, on leads 13, 14, respectively. These signals are stored in a storage unit 15, in sequence, but are read out in parallel. Assuming that eighteen (18) successive pulses are recorded, for each of $S_c(t)$ and $S_s(t)$, two sets of 18 parallel output channels are provided, 17–19, which lead to filter bank 20. The latter manipulates the signals applied thereto and provides on its output leads a plurality of Doppler category signals on leads 21. The Doppler category signals are operated on in a clutter discriminator 22, which serves to eliminate signals in Doppler categories for which strong clutter exists. The remaining signals are applied to a PPI cathode ray indicator via lead 23. The storage unit 15 also supplies sync pulses to the radar transmitter over lead 24, and more specifically to its modulator 25. The latter pulses transmitter 26, which is coupled in conventional fashion to a T–R switch 27 and a scanning antenna 28, the T–R switch 27 providing echo signal to coherent receiver 10.

The R.F. transmitter pulses available on line 11 (FIGURE 3) are applied to a frequency converter 40, and the R.F. receiver or echo pulses available on line 12 are applied to a converter 41. Each of converters 40 and 41 is supplied with local oscillator signal from a stable local oscillator or stalo 42. From the converters 40, 41 are derived I.F. signals, which are available on lines 43, 44. The I.F. signals available on lines 43, 44 differ in frequency by virtue of Doppler shifts due to target motion.

The signal available on line 43 is, after suitable amplification, applied to control the phase of a coherent I.F. oscillator or coho 47, or more generally, to synchronize the latter. The latter may now be assumed to oscillate continuously at a frequency fixedly related to the R.F. transmitter frequency and in coherent phase therewith.

The output of coherent oscillator 47 is converted by mixer 48 and local or displacement oscillator 49 by a small value, say 250 kc., to provide a displaced I.F. frequency signal on lead 50.

The signal on lead 50, which represents a steady state signal of fixed frequency deriving basically from coho 47, is applied in parallel channels containing isolation amplifiers 51, 52, respectively. The output of isolation amplifier 51 is phase shifted 90° in device 53, and the two channels lead to mixers 55 and 56, respectively, to which are applied in parallel the signal on lead 44. The latter may be applied via an amplifier 59 which is subjected to sensitivity or gain control on a time or range basis, i.e., its gain, which is initially small, is increased progressively as a function of range from which echoes are received. To this end a sawtooth gain control voltage is provided, via lead 58, which is synchronized with transmitted pulses, via lead 59. Gain control devices of this character are per se well known in the radar art. The output of amplifier 57 is amplitude limited in limiter 60, which may be provided with a limit control device.

The outputs of mixers 55, 56, present on leads 61, 62, respectively, constitute quadrature bipolar video signals, which have been beat down to a 250 kc. reference, instead of the usual zero frequency reference, by the action of mixer 48 and local oscillator 49.

The signals provided on leads 61, 62 are stored or recorded. While the storage function might be performed in a variety of ways, in a specific embodiment of the invention, magnetic drum recording is employed. The system must be capable of recording to about 500 kc. to accommodate the required range of Doppler frequencies.

In accordance with the preferred embodiment of the present invention, as illustrated in FIGURE 2, eighteen repetition periods must be recorded. While this could be accomplished on a single circumference of a single drum, this leads to a drum of excessive size. The surface speed of the drum should be $$V_s = \lambda f = 2 \times 10^{-3} \times 5.10^5$$
$$= 1000. \text{ in./sec.}$$

for certain practical reasons of drum design, where $\lambda$ is the wave length of the highest recorded frequency $f$.

The surface speed of the drum is $$V_s = \frac{\theta d}{2}$$

where $d =$ drum diameter $\theta =$ speed of rotation in radians per second $\theta = 2 f_{rep}/R+1$ where R is the number of repetition periods stored on the drum. Allowing one repetition period for erasure, $$d = \frac{(R+1)\sqrt{s}}{f_{rep}}$$

This leads to a 19" D drum for storing 17 repetition periods on a single track or circumference, which is acceptable for many applications. Where a smaller drum is desirable, the repetition periods are divided into groups, i.e., three tracks of six repetition periods each, requiring a drum diameter of about 7.5 in. The drum is then provided with 7 tracks, one for sync generation, and 3 each for bipolar video, and 6 record heads are provided, 36 write-out heads, and a rotation rate of 2571 r.p.m.

Reference is made to FIGURE 4 wherein is illustrated the physical configuration of a magnetic drum 65, rotating on a shaft 66. Seven tracks are provided, on the central one of which is recorded a sync signal. The latter is read out by head 67, and supplies sync signal to modulator 25 via lead 24 (see FIG. 2) as well as to the sensitivity time controlled amplifier 57.

The quadrature bipolar video signals available on leads 61, 62, i.e., $S_s(t)$ and $S_c(t)$ are applied to record heads 68, 69, of the first and fourth tracks, respectively. Associated with head 68 are two ancillary record heads 70, 71, and associated with head 69 are too ancillary record heads 72, 73. The mode of operation of heads 70, 71, 72, 73 will be described by reference to FIGURE 5. Readout heads are provided for each of tracks 1–3 and 5–7, identified by reference numeral 75 and equally spaced about each track. Each of the record heads may erase, or an erase head may be associated therewith.

Eighteen pulses being stored, but there being 12.5 pulses assumed per beamwidth, antenna weighting factors have values given by $$W(i) = \lambda - \left(\frac{2i+1}{12.5}\right)^2$$

and specific values are provided by the following table:

*Table of $W(i)$*

| $i$ | $W(i)$ |
|---|---|
| 8 | .2779 |
| 7 | .3689 |
| 6 | .4729 |
| 5 | .5850 |
| 4 | .6982 |
| 3 | .8046 |
| 2 | .8951 |
| 1 | .9609 |
| 0 | .9957 |
| −1 | .9957 |
| −2 | .9609 |
| −3 | .8951 |
| −4 | .8046 |
| −5 | .6982 |
| −6 | .5850 |
| −7 | .4729 |
| −8 | .3689 |
| −9 | .2779 | for $i = -9, -8, -7 \ldots -1, 0, 2 \ldots 8$. Here $i=8$ represents the latest repetiton period and $i=-9$ the signal receved 18 repetition periods previously. Beam center for the scanning antenna beam exists between $i=0$ and $i=-1$.

Referring now to FIGURE 5, and to treatment of $S_s(t)$ only, since treatment of $S_c(t)$ is similar, the signal $S_c(t)$ is amplified in drive amplifier 80, and applied to record head 68. The first pulse signal recorded travels around the track associated with head 68, which represents values of $i = 8, 7, 6, 5, 4, 3$. The last of the read-out heads in the track associated with head 68 feeds record head 70, via drive amplifier 81, which records pulses for which $i = 2, 1, 0, -1, -2, -3$. The last read-out head on the track associated with head 70, drives record head 71, via drive amplifier 82, and records pulses for which $i = -4, -5, -6, -7, -8, -9$. The signals supplied by the read-out heads, identified by their $i$ values, are thus available on separate leads 83, and represent the $S_s(i)$, discussed hereinabove. The $S_c(i)$ are developed similarly, and are available on leads 84. Weighting by the $W(i)$ factor is accomplished in amplifiers 90, the gains of which are adjusted to introduce weighting factors proportional to $W(i)$. The resulting outputs are designated $e_s(i)$ and $e_c(i)$.

The eighteen $e_s(i)$ signals and the eighteen $e_c(i)$ signals are now provided to sets of filters 20, FIGURE 2, each of which abstracts signals representative of one Doppler category.

A single Doppler filter is represented functionally in FIGURE 6. Each Doppler filter of the present system employs the same configuration, the distinction between filters residing in the weighting factors introduced by resistances 100. Assuming that the bandwidths of the Doppler filters are 24 cps., but that the separations of the center frequencies of the filters are 25 cps., in a specific embodiment of the invention, the $m$th filter will have a frequency of 25 m. $= f_d(m)$. The weighting of the $m$th filter is $$C_c(m) = \sum_{i=-9}^{i=8} \cos \theta_i(m) e_c(i) f$$

$$\sum_{i=-9}^{i=8} \sin \theta_i(m) e_c(i)$$

$$C_s(m) = \sum_{i=-9}^{i=1} \cos \theta_i(m) e_s(i) T$$

$$\sum_{i=-9}^{i=8} \sin \theta_i(m) e_c(i)$$

where $\theta_i(m) = 15(2i+1)m$ degrees, for the specified radar operating conditions and parameters.

So the value of resistance 100, associated with $e_c(-9)$ is selected for filter No. 1, i.e., for $m=1$, and therefore for Doppler frequency 25 c.p.s., such that its potential divides the signal $e_c(9)$ against the input impedance of the summing amplifier by a factor $\cos[\theta_{-9}(1)]$ or cos $$[(15)(19)°]$$

All filter weighting factors can be similarly calculated, and the values inserted by suitable selection of resistance 100.

Since the weighting factors may be positive or negative, each of the amplifiers 90 provides both inphase and inverted signals so as to account for algebraic sign. The output of the resistances 100 are summed in summing amplifiers 91 and 92 and applied to output leads 101, 102, respectively. The signals on the output leads 101, 102 are squared in squarers 103, 104, and the sum of the squares obtained in summing unit 105. A signal is then obtained at lead 106 if Doppler frequency $f_d(m)$ is present in the input.

Referring now to FIGURE 7, the outputs of the $m$ Doppler filters are applied on separate leads 110. A total of 12 filters is assumed, i.e., $m=0$ to 11, in the specific example, which equals the number of pulses per beamwidth, in the exemplary embodiment of the invention.

Each channel includes a pulse length discriminator 111, which in turn includes an integrator 112 having an integration time of about five to ten pulse lengths, and in parallel therewith a delay device 113 which introduces a delay equal to half the integration time. The output of integrator 112 is compared with the output of delay device 113, in comparator 114, and if a comparison is effected opens a normally closed gate 115. If no comparison is effected, the gate remains closed.

Comparison will be developed in response to extensive clutter, as great as or greater in range than 5–10 pulse lengths, introduced by the delay device 113. The outputs of all the discriminators are summed in summing amplifier 116, which supplies intensity control signal to a PPI scope. Any discriminator can be eliminated at will, manually, to eliminate certain Doppler categories for which a heavy interfering signal exists.

In operation, then, echo pulses are received in sequence, as the antenna beam scans across a target. The received pulses are converted to quadrature bipolar video pulses, which implies essentially that the received pulses are beat down to video by means of coherent signals synchronized from the transmitter pulses, but in two channels which have a 90° phase difference, i.e. one channel carries cos pulses and the other sin pulses. In a specific example, the pulses numbered $i$, may have values of $i$ extending from −9 to 8 where $i=-\frac{1}{2}$ would correspond to the beam-center. This value of $i$ is appropriate to a beamwidth of 12.5 pulses, and permits derivation of 12 Doppler categories. The $i$ pulses are magnetically recorded on two tracks, one for the cos pulses and the other for the sin pulses. Readout occurs in parallel for each track, and the readout heads have their outputs weighted by factors $Wi = A(iT)$, preferably.

The two channels contain signals which, ignoring the amplitude weighting, are as $$\cos(2\pi f_d iT + \phi)$$
$$\sin(2\pi f_d iT + \phi)$$

where $f_d$ is the Doppler frequency associated with the echo pulses, and $\phi$ is a random Doppler phase which occurs because the Doppler frequency can have any phase with respect to beam center.

The readout pulses are then weighted and added. The addition provides an integrative factor which serves to discriminate against noise. The weighting factor serves as a filtering device in conjunction with the addition, and to this end the weighting function is sinusoidal in nature. If a set of signals is received which matches the weightings, maximum output is provided. If the received set of signals does not match the weightings, in both amplitude and phase, a smaller output results. The weighted signals are so derived and combined as to provide an output which is independent of phase, so that the system produces an output for any Doppler category, in an appropriate filter, which does not depend on Doppler phase with respect to beam center.

A plurality of Doppler filters of the type above described are connected in parallel channels, and means are provided in each channel for cutting off the channel if extended clutter appears therein. The outputs of the channels are applied to a PPI scope.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a pulse radar system, means for transmitting first radio frequency pulses toward a target, means for receiving second echo radio frequencies pulses from said target, a coherent receiver responsive to said first and second pulses for generating third and fourth video pulses, said third and fourth video pulses having substantially a ninety degree phase relation and a Doppler frequency representative of velocity of said target, means for storing in separate time sequences predetermined numbers of said third video pulses and of said fourth video pulses, parallel read out means for reading out the stored video pulses, and filter devices for deriving from said parallel read out means an indication representative of the presence of one of a plurality of possible doppler frequency categories in the stored signals.

2. The combination according to claim 1 wherein said means for transmitting first radio frequency pulses toward a target includes a scanning antenna having a predetermined narrow beam width.

3. The combination according to claim 2 wherein said predetermined number of pulses approximates the number of pulses in said beam width during said scanning.

4. The combination according to claim 1 wherein said means for storing is a magnetic drum recorder including a read-in head responsive to each of said third and fourth video pulses, and a plurality of read-out heads arranged to read out said third and fourth video pulses simultaneously from said magnetic drum.

5. The combination according to claim 4 wherein is provided a means for combining the read out third and fourth video pulses to provide a response signal eliminating Doppler phase information from said third and fourth video pulses.

6. In a pulse radar system, means for transmitting pulsed radio frequency search signals toward a target for reflection thereby as an echo signal, means for receiving said echo signals, means responsive to said echo signals for deriving coherent Doppler frequency signals containing velocity information concerning said target, means consisting of a resistive weighting and integrating network responsive to said coherent Doppler frequency signals for generating a signal in response to essentially a single Doppler frequency.

7. A filter comprising a source of first pulse having a sinusoidal envelope, said pulses occurring in time sequence, a source of second pulses having a sinusoidal envelope, said second pulses occurring in time sequence, said pulse envelopes having the same frequencies and having a $\pi/2$ phase difference and said first pulses being coincident with said second pulses, and means responsive to sinusoidal weighting of said first and second pulses over a range of frequencies for generating responses of differential amplitudes maximized for one of said range of frequencies.

8. In a pulse radar system, means for transmitting first radio frequency pulses toward a target, said means including a scanning narrow beam antenna, means for receiving reflected pulses responsive to said first pulses, said reflected pulses being representable in envelope as (1) $A(t) \cos 2f_d t + \phi$, where $A(t)$ is modulation due to variation in antenna gain as beam center passes the target, where $f_d$ is Doppler frequency of the signal and where $\phi$ is a random Doppler phase, the actual echo signals being representable as (2) $S_c(i) = A(iT) \cos(2\pi f_d iT + \phi)$, where the $i$ are sample numbers of said echo pulses, and where $i=0$ is the sample at beam center, means for deriving in response to said reflected pulses a further sequence of pulses (3) $S_c(i) = A(iT) \sin(2\pi f_d iT + \phi)$, means for applying weighting $W(iT)$ factors to $A(iT)$ to provide amplitude weighted samples, $C_c(i)$ and $C_s(i)$ from $S_c(i)$ and $S_s(i)$ respectively, means for deriving $C(m)_c$ by operating on $e_c(i)$ and $e_s(i)$ according to the function $$\sum_i \cos \theta_i(m) e_c(i) + \sum_i \sin \theta_i(m) e_s(i)$$

means for deriving $C_s(m)$ by operating on $e_c(i)$ and $e_s(i)$ according to the function $$\sum_i \cos \theta_i(m) e_s(i) + \sum_i \sin \theta_i(m) e_c(i)$$

where $\theta_i(m)$ are discrete values of $\theta$ for a given Doppler frequency $f_d(m)$ and are proportional to $m$, means for forming $[C_c(m)]^2 + [C_s(m)]^2$.

References Cited in the file of this patent

UNITED STATES PATENTS

| | | |
|---|---|---|
| 2,298,987 | Thomsen | Oct. 13, 1942 |
| 2,659,076 | Emslie | Nov. 10, 1953 |
| 2,760,011 | Berry | Aug. 21, 1956 |
| 2,905,939 | Heyser et al. | Sept. 22, 1959 |